United States Patent
Koyama et al.

(10) Patent No.: US 9,379,548 B2
(45) Date of Patent: Jun. 28, 2016

(54) MULTILEVEL REACTIVE POWER COMPENSATOR

(71) Applicant: Kabushiki Kaisha Toshiba, Tokyo (JP)

(72) Inventors: Yushi Koyama, Tokyo (JP); Yosuke Nakazawa, Tokyo (JP); Hiroshi Mochikawa, Tokyo (JP); Atsuhiko Kuzumaki, Tokyo (JP); Takeru Murao, Saitama-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 57 days.

(21) Appl. No.: 14/080,456

(22) Filed: Nov. 14, 2013

(65) Prior Publication Data

US 2014/0133198 A1 May 15, 2014

(30) Foreign Application Priority Data

Nov. 15, 2012 (JP) .................. 2012-251426

(51) Int. Cl.
*H02M 7/49* (2007.01)
*H02J 3/18* (2006.01)
*H02M 7/483* (2007.01)

(52) U.S. Cl.
CPC ...... *H02J 3/1857* (2013.01); *H02M 2007/4835* (2013.01); *Y02E 40/26* (2013.01)

(58) Field of Classification Search
CPC .................. H02M 2001/0077; H02M 1/126; H02M 7/483; H02M 2007/4835; H02M 7/49; H02J 3/1857

See application file for complete search history.

(56) References Cited

U.S. PATENT DOCUMENTS

| | | | | |
|---|---|---|---|---|
| 5,642,725 | A * | 7/1997 | Sharples | 126/369 |
| 6,867,987 | B2 * | 3/2005 | Cheng | H02M 7/49 363/43 |
| 2010/0320949 | A1 * | 12/2010 | Fotherby | 318/400.26 |
| 2014/0103887 | A1 * | 4/2014 | Akagi et al. | 323/207 |

FOREIGN PATENT DOCUMENTS

JP 2012-175848 A1 9/2012

* cited by examiner

*Primary Examiner* — Harry Behm
*Assistant Examiner* — Peter Novak
(74) *Attorney, Agent, or Firm* — Baker Botts L.L.P.

(57) ABSTRACT

A reactive power compensator according to an embodiment comprises: multilevel inverter circuits respectively constituting each of the three phases; a filter circuit for reducing harmonics connected between the output terminals of each of the multilevel inverter circuits and a power system interconnection terminal; and a control section for causing prescribed three-phase AC voltage to be output by controlling each of said multilevel inverter circuits. Each of the multilevel inverter circuits is constituted by connecting in series one or more single-phase full-bridge single-pulse inverters and is arranged to convert DC voltage to respective positive and negative single-pulse voltages once per cycle of the fundamental wave of the voltage instruction value.

15 Claims, 7 Drawing Sheets

US 9,379,548 B2

MULTILEVEL REACTIVE POWER COMPENSATOR

CROSS REFERENCE TO RELATED APPLICATION

This application claims benefit of priority to Japanese Application No. JP2012-251426 filed Nov. 15, 2012; the entire contents of which are incorporated by reference herein.

FIELD

Embodiments described herein relate generally to a reactive power compensator used to stabilize a power system voltage by injecting reactive power into the system.

BACKGROUND

In an increasing number of cases, distributed power sources such as solar power generation (or sometimes is called photovoltaic generation), wind power generation (or sometimes is called wind force power generation) or fuel cells are being linked with power systems: this gives rise to concern regarding possible fluctuation of the system voltage. In particular, further increase in domestic solar power generation is anticipated. When a large amount of power is generated and the load is small, large reverse power flows may occur, causing elevation or rising of the voltage of the distribution network, which may therefore depart from the rated value of the system voltage.

Conventionally, such voltage elevation is suppressed by throttling the generated power. However, with this method, the power that could be generated is throttled, so this is wasteful in energetic terms. If a reactive power compensator is employed to inject reactive power into the system, the system voltage can be lowered without giving rise to wastage of energy, so distributed power sources such as solar power can deliver the full power of which they are capable. However, conventional reactive power compensators were of large weight and volume and were therefore mostly installed at the delivery terminal side, such as an electrical substation. In order to cope with elevation of the system voltage of the distribution network resulting from the use of distributed power sources such as domestic solar power generation, there is therefore a demand for a reactive power compensator of small size that can be installed even in narrow residential streets.

One means of reducing the size of a reactive power compensator is the method of reducing the size of the AC filter reactor (Reactor means here inductor), by converting the voltage waveform that is output by the semiconductor power inverter section to a voltage waveform with fewer higher harmonics, which is closer to a sine wave. Conventionally, in order to output a voltage waveform with few higher harmonics, the method was adopted of creating an interconnection voltage waveform by connecting in series multiple PWM (Pulse Width Modulation) inverters that output pulse width-modulated voltage waveforms of small voltage width. The size of the AC filter reactor can be reduced by reducing the harmonics of the output voltage by superimposing pulse outputs of small voltage width. Also, ample withstand-voltage can be achieved by increasing the number of multiple PWM inverter stages that are connected in series: in this way, reduction in size can be obtained without employing a system-interconnection transformer.

Such an arrangement is described in the Japanese technical reference: "Operation Verification using 6.6 kV Transformerless Cascade PWM STATCOM-Three-Phase 200V 10 kVA Mini Model" (Journal of the Institute of Electrical Engineers of Japan Industrial Applications Section, 2007, Vol. 127, No. 8 pp 781-788) (hereinafter referred to as Non-patent Reference).

When a cascade multilevel PWM inverter connect to 6.6 kV system without transformer, the number of PWM inverter stages becomes large as shown in FIG. 11, the following problems arise. If for example 1.7 kV IGBTs (Insulated Gate Bipolar Transistor) are employed, six stages are required for each phase. When the number of inverter stages becomes large, in the first place, the number of inverter gate circuits required becomes correspondingly large, resulting in a corresponding increase in volume and circuit complexity. Also, the number of PWM switching circuits becomes large, so the total switching loss generated in the various stages becomes large. Although the number of stages can be reduced by using semiconductor devices of high withstand-voltage in the inverters, generation of heat is increased due to increased switching loss. If the switching frequency is lowered, switching loss decreases, but, since the amount of harmonics in the voltage output is increased, the filter reactor must be made large.

According to an aspect of the present technology, an object of this embodiment is to provide a small-size reactive power compensator wherein voltage harmonics can be reduced to a thoroughly satisfactory extent using cascade connected inverters, with a small number of stages, and in which transformerless interconnection with a power system can be achieved.

In order to achieve the above object, a reactive power compensator according to this embodiment is constructed as follows. Specifically, it comprises: multilevel inverter circuits respectively arranged as three-phase circuit phases; filter circuits for reducing current harmonics connected between the outputs of the multilevel inverter circuits and system interconnection terminals; and a control section for controlling the aforementioned multilevel inverter circuits and outputting prescribed three-phase AC voltage. The aforementioned multilevel inverter circuits are constituted by connecting in series two or more single-phase full-bridge single-pulse inverters that convert DC voltage to respective positive and negative single-pulse voltages once per cycle of the fundamental wave of the voltage instruction value; the terminals on the opposite side of the aforementioned multilevel inverter circuits to that of the system terminal are connected as neutral points in all phases.

DETAILED DESCRIPTION OF THE PREFERRED EMBODIMENTS

Reactive power compensators according to embodiments are described below with reference to the drawings.

First Embodiment

Figure 1:
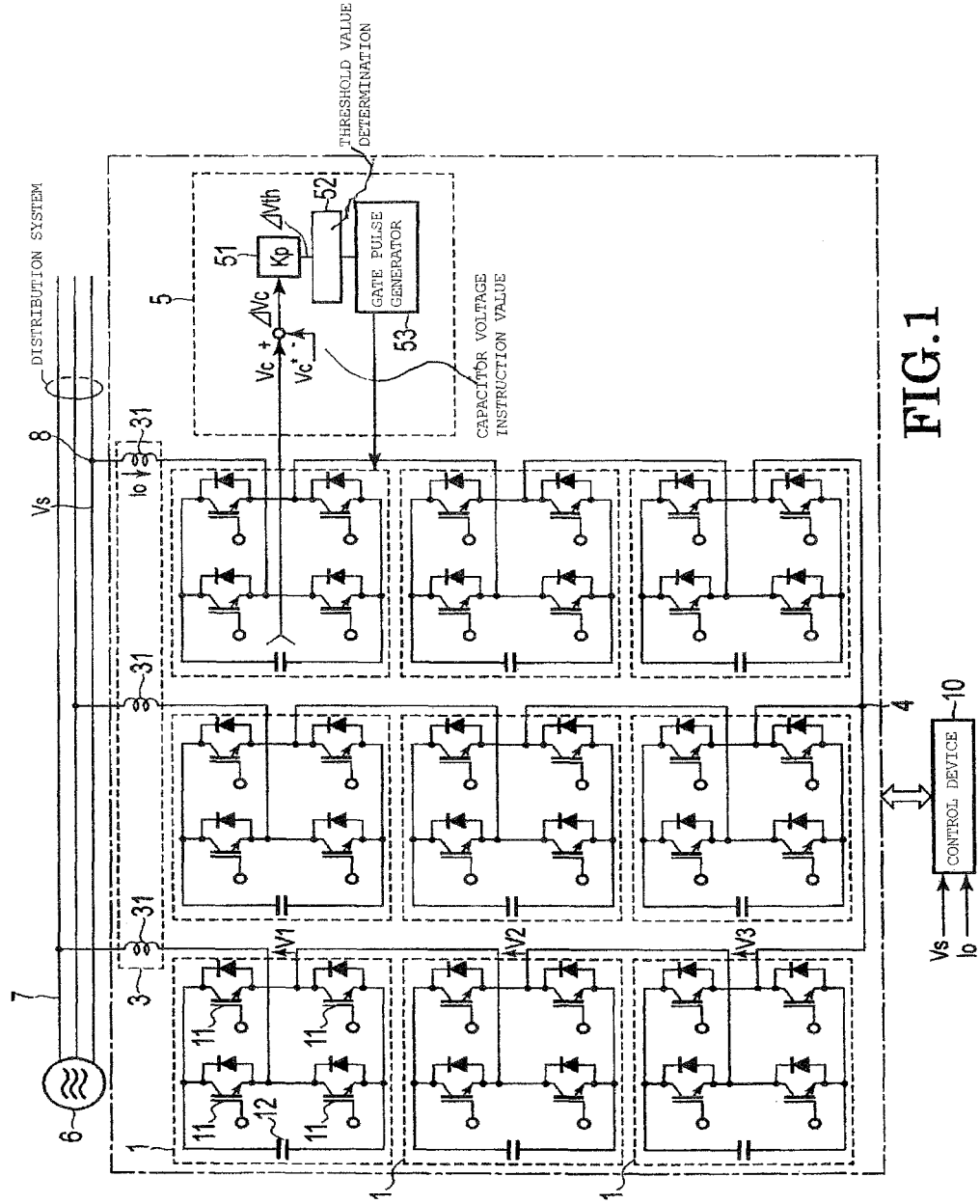
FIG. 1 is a layout diagram showing a reactive power compensator according to a first embodiment.

FIG. 1 is a layout diagram showing a reactive power compensator according to a first embodiment;

This reactive power compensator comprises: single-phase full-bridge single-pulse inverters 1 each constituted by a high withstand-voltage semiconductor device 11 and a DC capacitor 12; and reactors 31 constituting an AC filter 3 connected with a system interconnection terminal 8; the terminals on the opposite side to the system terminals being mutually connected as a neutral point 4 in all phases. The reactive power compensator is interconnected with a distribution system 7 that is supplied with power from a system power source 6. A control device 10 performs overall control of the three-phase inverters shown in FIG. 1 by calculating reactive current instruction values and output voltage instruction values etc based on the system voltage Vs and the output current Io of the single-pulse inverters.

FIG. 1 shows a typical example of a control section 5 for a single single-pulse inverter 1. Respective control sections 5 are provided for each single-pulse inverter 1. The control section 5 generates gate pulses (described in detail later) that perform ON/OFF control of a semiconductor device 11 constituting a single-pulse inverter 1, by calculating the single-pulse instruction values i.e. ON/OFF timings (phase) of the single-pulse inverter 1, based for example on the output voltage instruction value from the control device 10, a prescribed threshold value, and a capacitor voltage Vc.

Figure 2:
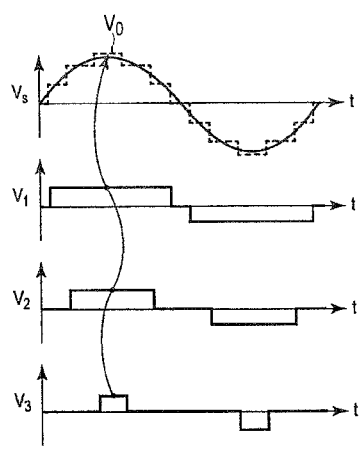
FIG. 2 is a waveform diagram showing the operation of the single-pulse inverters 1.

Next, the operation of the single-pulse inverters 1 will be described with reference to FIG. 2.

The voltage V1 that is output by a single-pulse inverter 1 is of a form in which, during a single cycle of the fundamental wave of the voltage instruction value Vref, a voltage pulse is output once in the positive voltage and once in the negative voltage of the voltage instruction value Vref. When three single-pulse inverters are connected in series, voltage is output with the single-pulse timings apportioned as indicated by V1, V2 and V3. The total voltage (Vo) of V1, V2 and V3 assumes a step wise waveform, in which harmonics are reduced. The reactive current is controlled by controlling this output waveform Vo and reactive power compensation is thereby performed.

Since the single-pulse inverters 1 are constituted using high withstand-voltage semiconductor devices, when they are connected in series, the withstand-voltage can be even further increased; in addition, the number of times of switching of the semiconductor devices is enormously fewer than in the case of pulse-width modulation PWM inverters, so, even if semiconductor devices of high withstand-voltage, which have large switching losses, are employed, there is substantially no switching loss per stage: thus, even if the number of series connections is increased, switching losses do not present much of a problem. By thus connecting single-pulse inverters using high withstand-voltage semiconductor devices in series in each phase, a reactive power compensator of small size can be realized that can be interconnected with power distribution system without transformer.

Although in FIG. 1 the single-pulse inverters 1 were connected in series in three stages for each phase, five stages or six stages etc could be employed. Also, although, in FIG. 1, a capacitor was employed as the DC voltage source in the construction of each inverter, these could be replaced by power sources such as storage batteries or a switching power source.

Second Embodiment

Figure 3:
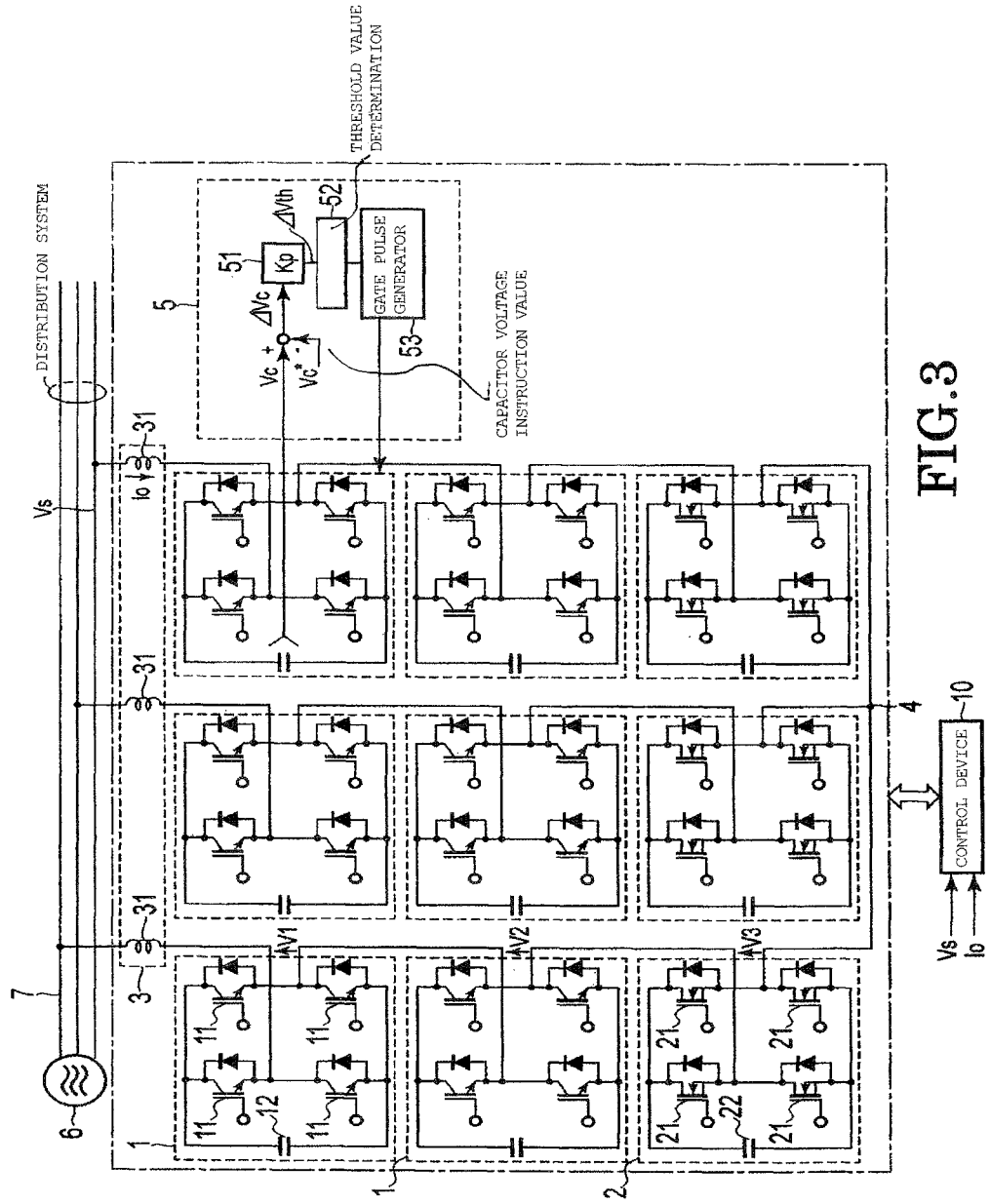
FIG. 3 is a layout diagram showing a reactive power compensator according to a second embodiment.

FIG. 3 is a view showing the layout of a reactive power compensator according to a second embodiment. It should be noted that, hereinafter, the same reference symbols as those employed in FIG. 1 designate structural elements that are identical with or correspond to structural elements of the reactive power compensator shown in FIG. 1.

This reactive power compensator comprises in each phase a single-pulse inverter 1 of single-phase full-bridge construction constituted by a DC capacitor 12 and high withstand-voltage semiconductor device 11; a PWM (pulse width modulation) inverter 2 of single-phase full-bridge construction constituted by a DC capacitor 22 and a semiconductor device 21 of lower withstand-voltage than the high withstand-voltage semiconductor device 11; and an reactor 31 constituting an AC filter 3: the terminals thereof on the opposite side to the system terminals are mutually connected in each phase at the neutral point 4. The DC voltage of the single-pulse inverters 1 is larger than the DC voltage of the PWM inverters 2. The reactive power compensator is interconnected with wiring 7 that is supplied with power from the system power source 6. Also, a control section 5 is provided in the same way as in the case of Embodiment 1.

The operation of the single-pulse inverter 1 and the PWM inverter 2 will now be described with reference to FIG. 4. Just as in the case of Embodiment 1, the single-pulse inverter 1 outputs a voltage pulse once in the positive voltage and once in the negative voltage of the voltage instruction value in a single cycle of the fundamental wave of the voltage instruction value Vref. When the single-pulse inverters 1 output single-pulse voltages as V1 and V2 in FIG. 4, the PWM inverter 2 outputs a voltage waveform V3 (=Vref−(V1+V2)) obtained by subtracting the single-pulse voltages (V1+V2) from the voltage instruction value Vref. In fact, the PWM inverter 2 outputs the voltage waveform V3 as a pulse width-modulated waveform. Since the PWM inverter 2 outputs a waveform such as to compensate the single-pulse output voltage with respect to the voltage instruction value Vref, the DC voltage of the PWM inverter 2 may have a magnitude of about half the DC voltage of the single-pulse inverters 1. In fact it may take the magnitude of 50% to 100%. When these single-pulse voltages and the PWM voltage are totaled in each phase, a waveform corresponding to the voltage instruction value waveform is output. The reactive power compensation operation is performed by controlling the reactive current by controlling this output waveform.

Apart from the fact that harmonics can be reduced even with a small number of stages by combining a PWM inverter 2 that outputs a PWM waveform with single-pulse inverters 1, since the single-pulse inverters 1 are constituted using high withstand-voltage semiconductor devices, the withstand-voltage can be further increased in series connection. In this way, by combining single-pulse inverters using high withstand-voltage semiconductor devices with PWM inverters and connecting in series in each phase, harmonics can be further reduced and the filter circuit reduced in size, making it possible to achieve interconnection of the transformerless reactive power compensator with a distribution system with a small number of inverter stages, thereby making it possible to realize a miniaturized reactive power compensator.

Although, in FIG. 3, two single-pulse inverter 1 stages and a single PWM inverter 2 stage were connected in series in each phase, so long as the withstand-voltage of the PWM inverter 2 is not sufficient, it would be possible to employ for example two or three PWM inverter 2 stages, or to employ three or four single-pulse inverter 1 stages. If a plurality of PWM inverter stages are employed, the total of their DC voltages per phase may have a magnitude of 50 to 100% of the DC voltage per single-pulse inverter 1. Also, a single single-pulse inverter 1 stage may be employed if its withstand-voltage is sufficient. In fact the numbers of single-pulse inverters 1 and PWM inverters 2 may be combined in any construction provided that a sufficient withstand-voltage is ensured.

Also, although, in FIG. 3, a capacitor was employed for the DC voltage comprised in each inverter, a power source such as a storage battery or switching power source could be employed.

Third Embodiment

Figure 5:
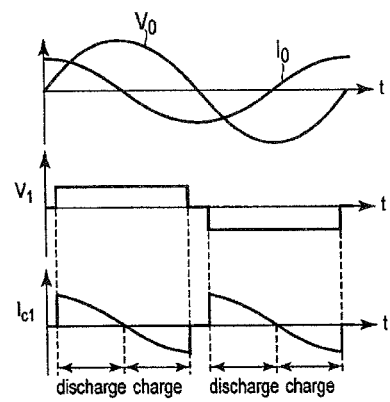
FIG. 5 is a waveform diagram showing charging/discharging of a DC capacitor of a single-pulse inverter 1.
Figures 6A, 6B:
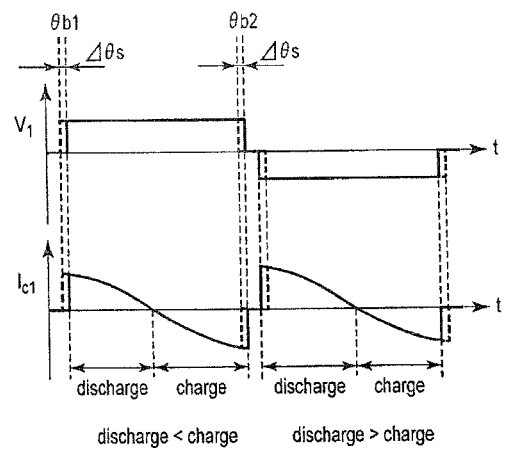
FIG. 6A and FIG. 6B are views showing the principles of control of the DC capacitor voltage by shifting of the phase of the single-pulse voltage.

FIG. 5, FIG. 6A, and FIG. 6B are views showing the principles of a method of controlling the voltage of the DC capacitor 12 of a single-pulse inverter 1 according to Embodiment 1 or Embodiment 2 of the present invention.

The inverters of each of the stages constituting the reactive power compensator are respectively provided with a DC capacitor, which provides the voltage source of the inverters of each stage. A problem is that, since the single-pulse inverter 1 only outputs a pulse twice during a single cycle of the system fundamental wave 1, it is difficult to control the voltage of the DC capacitor 12 to a rated voltage. Unless this voltage is controlled to a rated voltage, distortion of the current may occur, which may prevent continued operation.

FIG. 5 shows the voltage V1 that is output by the single-pulse inverter 1 and the current Ic1 that flows in the DC capacitor 12 when the reactive power compensator in the embodiment of FIG. 1 or FIG. 3 outputs leading reactive current. The direction in which current is discharged from the capacitor is taken as the positive direction of the current. In a single cycle of the output voltage Vo, the current Ic1 flows twice in the positive direction and negative direction respectively. When the current flows in the positive direction the DC capacitor 12 is discharged; when the current flows in the negative direction the DC capacitor 12 is charged. When the output current consists solely of reactive current, if the center in the width of the single pulse coincides with the peak of the output voltage waveform, the charging amount and the discharging amount coincide and the average voltage of the DC capacitor 12 is unchanged. This means that, if the phase with which the single pulse is turned ON or OFF, as in FIG. 6A and FIG. 6B, is offset in the same direction (i.e. is shifted in phase) by respectively identical amounts $\Delta\theta s$ from the phases $\theta b1$, $\theta b2$ at which it would otherwise be turned ON/OFF, the discharging amount and charging amount can be thereby controlled. In the case of FIG. 6A, since the charging period becomes longer than the discharging period due to such lag of the single-pulse phase by $\Delta\theta s$, the voltage of the DC capacitor 12 is elevated. Also in the case of FIG. 6B, since the discharging period becomes longer than the charging period due to lead of the single-pulse phase, the voltage of the DC capacitor 12 is lowered.

In this way, the voltage of the DC capacitor 12 of the single-pulse inverter 1 can be controlled by controlling the phase of the single-pulse voltage that is output by the single-pulse inverter 1.

FIG. 5, FIG. 6A, and FIG. 6B are views for the case where the reactive current is a leading reactive current. However, in the case where the reactive current is a lagging reactive current, the direction of shifting of the single-pulse phase for charging and discharging of the capacitor 12 is in the opposite direction to that of the case of a leading reactive current.

Fourth Embodiment

Figure 7:
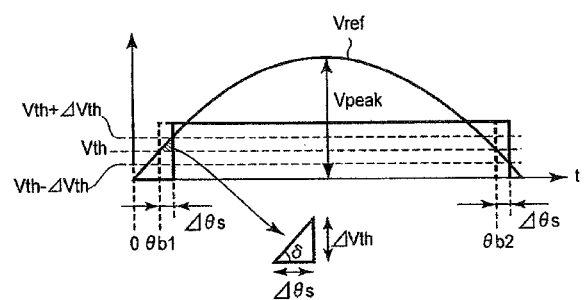
FIG. 7 is a view showing comparison of a voltage instruction value with a threshold value that determines the timing of the single-pulse voltage.

FIG. 7 is a view showing a comparison of the threshold value that determines the timing of the single-pulse voltage with respect to the voltage instruction value of a reactive power compensator according to a fourth embodiment. This view shows the positive half cycle of the sine wave.

The timing with which the single-pulse inverter 1 outputs the single-pulse voltage is determined based on a comparison of the voltage instruction value Vref with which this phase would be expected to be output and the reference threshold value Vth which is used for deciding the ON/OFF timing of the single-pulse voltage. The single pulse is turned ON when the voltage instruction value Vref exceeds the threshold value Vth and the single pulse is turned OFF when the voltage instruction value Vref is below the threshold value Vth. In order to control the phase of the single pulse, the threshold value controlled variable $\Delta V th$ is added to or subtracted from the threshold value Vth. By making the threshold value at which the single pulse is turned ON be Vth+$\Delta V th$, the phase at which the single pulse is turned ON is lagged from $\theta b1$ by $\Delta\theta s$. Also, by making the threshold value at which the single pulse is turned OFF be Vth-$\Delta V th$, the phase at which the single pulse is turned OFF is lagged from $\theta b2$ by $\Delta\theta s$. In this way, the phase at which the single pulse is turned ON or OFF can be shifted in the same direction respectively by the same amount $\Delta\theta s$ from the original phases $\theta b1$, $\theta b2$ of turning ON/OFF. When it is desired to lead the phase of the single pulse, this can be done by adding or subtracting the controlled variable $\Delta V th$ in the contrary way.

Regarding the relationship between $\Delta V th$ and $\Delta\theta s$, as shown in the Figure, a differential portion (or a minute portion or an extremely small portion) indicated by the shading in FIG. 7 can be represented as follows taking this differential portion as a right-angled triangle, using the peak Vpeak of the voltage reference value Vref and the original ON/OFF phase $\theta b$, where $\theta b = \theta b1 = \pi - \theta b2$.

$$\text{Gradient} = \Delta Vt / \Delta \theta s \qquad \text{[Math 1]}$$
$$= V_{peak} \frac{d}{d\delta} \sin\delta \bigg|_{\delta=\theta b}$$
$$= V_{peak} \cos\theta_b$$

So Δθs can be expressed by the following expression:

$$\Delta\theta s = \frac{\Delta Vth}{Vpeak \cos\theta b} \quad (1)$$

From this relationship expression, the phase of the single pulse can be controlled by controlling the threshold voltage Vth, thereby making it possible to control the voltage of the DC capacitor 12.

The control section 5 (FIG. 1 or FIG. 3) calculates the controlled variable ΔVth by multiplying the difference (or deviation) ΔVc of the capacitor voltage VC and the capacitor voltage instruction value (rated voltage) Vc* by the gain Kp. The threshold value determination section 52 determines the turn ON phase of the single pulse by comparing the output voltage instruction value Vref with the value obtained by adding the controlled variable ΔVth to the threshold value Vth corresponding to the turn ON reference phase θb1 of the single pulse. When determining the turn OFF phase of the single pulse, the output voltage reference value Vref and the value obtained by subtracting the controlled variable ΔVth from the threshold value Vth are compared. The threshold value determination section 52 determines the turn ON phase and the turn OFF phase of the single pulse in this way, and outputs these phases to the gate pulse generator 53. The gate pulse generator 53 generates a gate pulse for the semiconductor device 11 constituting the single-pulse inverter 1 using this turn ON phase and turn OFF phase of the single pulse.

Figure 8:
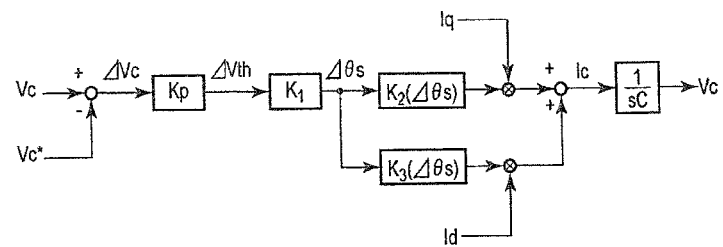
FIG. 8 is a view showing a control block for finding the gain Kp.

FIG. 8 shows a control block for finding the gain Kp. The DC capacitors 12 provided in the single-pulse inverters 1 are respectively individually controlled as in FIG. 8.

When the reactive power compensator operates as an reactor, if the current I flowing in the DC capacitor 12 is represented as the sum of the reactive current and the active current, taking the active current peak value as Id and the reactive current peak value as Iq, we have:

[Math 2]

$$I = I_d \sin\theta - I_q \cos\theta \quad (2)$$

and the average current Ic during the period θb+Δθs to π−θb+Δθs in which the single-pulse inverter 1 is ON is:

[Math 3]

$$I_c = \frac{1}{\pi}\int_{\theta_b+\Delta\theta_s}^{\pi-\theta_b+\Delta\theta_s}(I_d\sin\theta - I_q\cos\theta)d\theta \quad (3)$$

$$I_c = \frac{2}{\pi}(I_d\cos\theta_b\cos\Delta\theta_s + I_q\cos\theta_b\sin\Delta\theta_s) \quad (4)$$

Integrating this, the voltage of the DC capacitor 12 is Vc. Representing this in the form of a control block, FIG. 8 is obtained. The controlled variable ΔVth of the voltage threshold value of Vth that determines the ON/OFF timing of the single pulse is obtained by multiplying the gain Kp with the voltage Vc of the DC capacitor 12 and the difference ΔVc of the instruction value Vc* thereof. From the relational expression (1) of ΔVth and Δθs, K1 is

[Math 4]

$$K_1 = \frac{1}{V_{peak}\cos\theta_b} \quad (5)$$

Also, from expression (4), K2 (Δθs) and K3 (Δθs) are

[Math 5]

$$K_2(\Delta\theta_s) = \frac{2}{\pi}\cos\theta_b\sin\Delta\theta_s \quad (6)$$

$$K_3(\Delta\theta_s) = \frac{2}{\pi}\cos\theta_b\cos\Delta\theta_s \quad (7)$$

Figure 9:
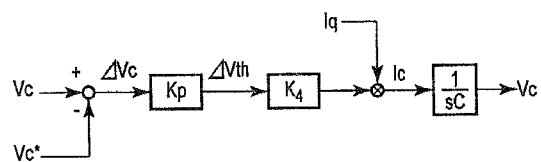
FIG. 9 is a view showing a control block for finding the gain Kp.

The transfer function can be found from this control block; however, since Δθs is extremely small, we may put:

[Math 6]

$$\sin\Delta\theta_s \approx \Delta\theta_s, \cos\Delta\theta_s \approx 1 \quad (8)$$

and since Iq>>Id, the Id terms may be eliminated, whereupon we can express the control block as in FIG. 9, where K4 is:

[Math 7]

$$K_4 = \frac{2}{\pi V_{peak}} \quad (9)$$

cos θb of K1 and K3 being cancelled out. Although, just as in the case of V1 and V2 in FIG. 4, the phase θb with which the respective single-pulse inverters turn ON/OFF is different depending on the number of single-pulse inverter stages, θb is irrelevant to determining the value of the gain Kp. Specifically, if, in setting the voltage control gain Kp the single-pulse inverters 1, the gains Kp are all set to the same value, the same control characteristics are obtained in all the single-pulse inverters. Also, from the control block of FIG. 9 and expression (9),

[Math 8]

$$\text{Transfer function} = Vc/Vc^* \quad (10)$$

$$= \frac{1}{S\frac{\pi V_{peak}C}{2I_qKp} + 1}$$

So the gain Kp can be expressed by the following expression (11),

[Math 9]

$$K_p = \frac{\pi V_{peak}C}{2I_qT_i} \quad (11)$$

where Ti is a time constant. The controlled variable ΔVth of the voltage threshold value Vth, which determines the timing of the single-pulse being turned ON/OFF, is obtained by setting the gain Kp from the above expression (11) and multiplying this by the difference ΔVc of the voltage Vc of the DC capacitor 12 and its instruction value Vc*: the voltage Vc of the DC capacitor 12 can thus be controlled by shifting the phase of the single pulse by an amount Dθs.

Also, as shown in the third embodiment (FIG. 5, FIG. 6A, FIG. 6B), whether the single-pulse phase is led or lagged depends on whether the DC capacitor 12 is charged or discharged by leading or lagging of the reactive current Id. This may be achieved by the control device 10 by identifying, from the reactive current instruction value supplied from the control device 10, whether the reactive current that is output by reactive power compensator is leading or lagging, and adjusting the sign of ΔVth by multiplying Kp by +1 or −1. For example, if the reactive current instruction value is led, it is necessary that the current should be directed in the discharge direction when ΔVc is positive, so the single-pulse phase is led: thus Kp is multiplied by −1 so as to make ΔVth a negative value. If ΔVc is negative, we have the contrary situation, so the sign of Kp may be left unaltered.

Fifth Embodiment

The reactive power compensator according to the fifth embodiment comprises a plurality of single-pulse inverters 1 in each phase; the pulse patterns of the single-pulse voltages in the plurality of single-pulse inverters 1 in each stage are interchanged with a fixed period.

Figure 4:
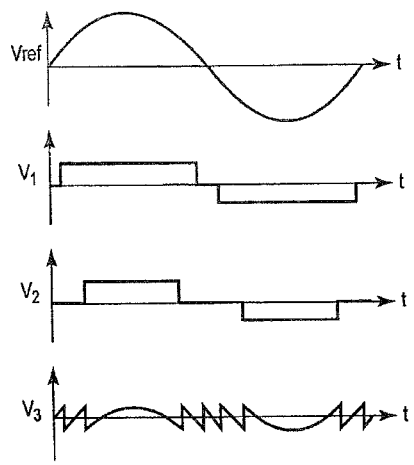
FIG. 4 is a waveform diagram showing the operation of the single-pulse inverters 1 and a PWM inverter 2.

For example, if two single-pulse inverters 1 are provided in each phase, single-pulse voltages of different pulse width are respectively output, as indicated by V1 and V2 in FIG. 4. If this is done, the current conduction times in the respective single-pulse inverters 1 are different, so differences appear in the amount of heat generated, resulting in differences in the performance and life of the semiconductor devices.

In this embodiment, in order to deal with this difference in amount of heat generated, in each phase, the single-pulse inverter that outputs the pulse pattern of V1 and the single-pulse inverter that outputs the pulse pattern of V2 are interchanged with a fixed period. Specifically, the threshold values that determine ON/OFF of the respective single pulses may be interchanged.

If there are two single-pulse inverters 1 in each phase, the amounts of heat generated can be averaged by interchanging these with a fixed period as described above: if there are three or more single-pulse inverters 1 in each phase, the amounts of heat generated can be averaged by interchanging the patterns sequentially among these three inverters so that the same pattern comes round again once every three cycles. The same applies if there are four or more inverters per phase.

Sixth Embodiment

Figure 10:
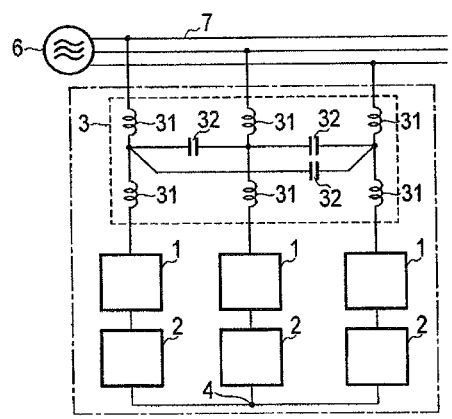
FIG. 10 is a layout diagram of the case where an AC filter of a reactive power compensator is constituted by reactors and capacitors.
Figure 11:
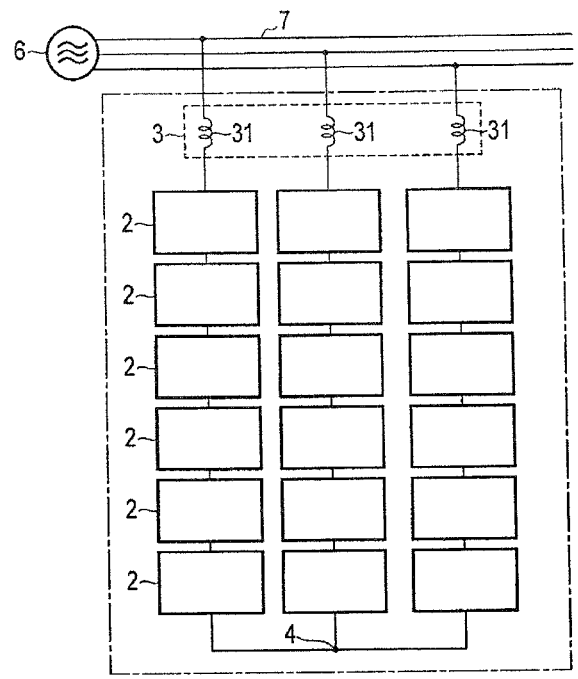
FIG. 11 is a layout diagram of a conventional reactive power compensator constituted by multilevel-connected PWM inverters.

FIG. 10 is a view showing a reactive power compensator in which the AC filter according to the sixth embodiment is constituted by reactors and capacitors.

Even if a PWM inverter 2 is combined with the single-pulse inverter 1, since the total voltage that is output is a combination of square waves, there are limits to the extent to which the current harmonics can be reduced. The AC filter 3 has the role of ensuring a fully sufficient reduction in the current harmonics which, as mentioned, can only be reduced to a limited extent by employing inverters alone. Although, in FIG. 1, the AC filter 3 was constituted solely by reactors 31, more effective reduction of the amount of harmonics can be achieved by adopting an LCL (Inductance-Capacitance-Inductance: "L" means Inductance) construction by additionally employing capacitors, as shown in FIG. 10.

Although in FIG. 10 respectively a single single-pulse inverter 1 and PWM inverter 2 are shown in each phase, just as in the case of the first embodiment, a plurality of single-pulse inverters 1 or PWM inverters 2 could be employed.

While various embodiments of the present invention have been described, these embodiments are presented merely by way of example and are not intended to restrict the scope of the invention. Additional novel embodiments could be implemented in various other modes without departing from the gist of the invention, by various deletions, substitutions or alterations. Such embodiments and modifications thereof are included in the scope of the invention and are included in the invention set out in the patent claims and the scope of equivalents thereof.

What is claimed is:

1. A reactive power compensator comprising:
multilevel inverter circuits respectively constituting each of three phases;
a filter circuit for reducing harmonics connected between a system interconnection terminal and an output terminal of each of said multilevel inverter circuits; and
a control section that outputs a prescribed three-phase AC voltage by controlling each of said multilevel inverter circuits,
wherein said multilevel inverter circuits are constituted by connecting in series two or more single-pulse inverters of single-phase full-bridge construction that convert DC voltage respectively to positive/negative single-pulse voltages once per cycle of a fundamental wave of a voltage instruction value, and
terminals of said multilevel inverter circuits on an opposite side to a terminal of a power system are connected, in all phases, as a neutral point;
wherein said control section determines a single-pulse phase with which single pulses are output by said single-pulse inverters based on a comparison of a threshold value and a voltage instruction value of said single-pulse inverters and said threshold value is variable, a voltage of a DC capacitor in said single-pulse inverter is controlled by said variable threshold value.

2. The reactive power compensator according to claim 1, wherein one or all of DC voltage sources with which said single-pulse inverters are respectively provided is a capacitor.

3. The reactive power compensator according to claim 1, wherein said control section individually controls voltage of said capacitors by offsetting a phase of turning ON and OFF which single pulses output by said single-pulse inverters respectively by a same amount and in a same direction.

4. The reactive power compensator according to claim 1, wherein said control section determines a single-pulse phase with which single pulses are output by said single-pulse inverters based on a comparison of a threshold value and a voltage instruction value of said single-pulse inverters, and controls a capacitor voltage by offsetting said single-pulse phase based on a threshold controlled variable obtained by multiplying difference of said capacitor voltage of said capacitor on a DC side of said single-pulse inverters and a capacitor instruction value thereof by a gain.

5. The reactive power compensator according to claim 4, wherein said control section identifies whether an output current is a leading current or lagging current from an instruction value of a reactive current and determines a direction of offset of said single-pulse phase in accordance with a result of an identification.

6. The reactive power compensator according to claim 4, wherein said gain is a same value in a control of said capacitor voltage of in all of said single-pulse inverters, and said gain is determined by a product of π, Vpeak, and capacity of said capacitor, and then division by 2, reactive current effective value, and time constant.

7. The reactive power compensator according to claim 1, wherein said control section interchanges said threshold value with another threshold value in said single-pulse inverter for each phase in a selected time period.

8. The reactive power compensator according to claim 1, wherein said filter circuit is constituted solely by reactors.

9. The reactive power compensator according to claim 1, wherein said filter circuit is constituted by reactors and capacitors.

10. A reactive power compensator comprising:
multilevel inverter circuits respectively constituting each of three phases,
a filter circuit connected between an output terminal of each of said multilevel inverter circuits and a system interconnection terminal of a power system for reducing harmonics, and
a control section that causes prescribed three-phase AC voltages to be output by controlling each of said multilevel single-pulse inverter circuits,
wherein each multilevel inverter circuit comprises:
    a first inverter circuit that converts a DC voltage to positive/negative respective single-pulse voltage once per cycle of a fundamental wave of a voltage instruction value and is constituted by one or more series-connected single-pulse inverters of single-phase full-bridge construction; and
    a second inverter circuit connected in series with said first inverter circuit, and that performs pulse-width modulation on a DC voltage such as to compensate an output of said first single-pulse inverter circuit with respect to an voltage instruction value, and constituted by connecting in series one or more PWM inverters of single-phase full-bridge construction; and
wherein terminals of each phase on an opposite side to a terminal of said power system are connected in all phases as a neutral point;
a DC voltage of said single-pulse inverters is larger than a DC voltage of said PWM inverter; and
a withstand-voltage of a semiconductor device constituting said single-pulse inverter is higher than a withstand-voltage of a semiconductor device constituting said PWM inverter.

11. The reactive power compensator according to claim 10, wherein a total value per phase of DC voltages of said PWM inverters is 50% to 100% of a DC voltage per stage of said single-pulse inverters.

12. The reactive power compensator according to claim 10, wherein said control section individually controls said capacitor voltages by offsetting phases of turning ON and OFF which single pulses output by said single-pulse inverters respectively by a same amount and in a same direction.

13. The reactive power compensator according to claim 10, wherein said control section determines a single-pulse phase with which a single pulse is output by said single-pulse inverter, based on a comparison of a threshold value with a voltage instruction value of said single-pulse inverter, and controls said capacitor voltages by offsetting said phase of said single pulses, based on a threshold controlled variable obtained by multiplying a difference of a capacitor voltage instruction value and a capacitor voltage of said capacitor on a DC side of said single-pulse inverter by a gain.

14. The reactive power compensator according to claim 10, wherein said filter circuit is constituted solely by reactors.

15. The reactive power compensator according to claim 10, wherein said filter circuit is constituted by reactors and capacitors.

* * * * *